July 4, 1967
E. HUSTINX
3,329,479
PROCESS FOR RECOVERING CALCIUM CHLORIDE FROM THE
AMMONIUM CHLORIDE WASTE LIQUOR OF THE
AMMONIA SODA PROCESS
Filed April 21, 1964
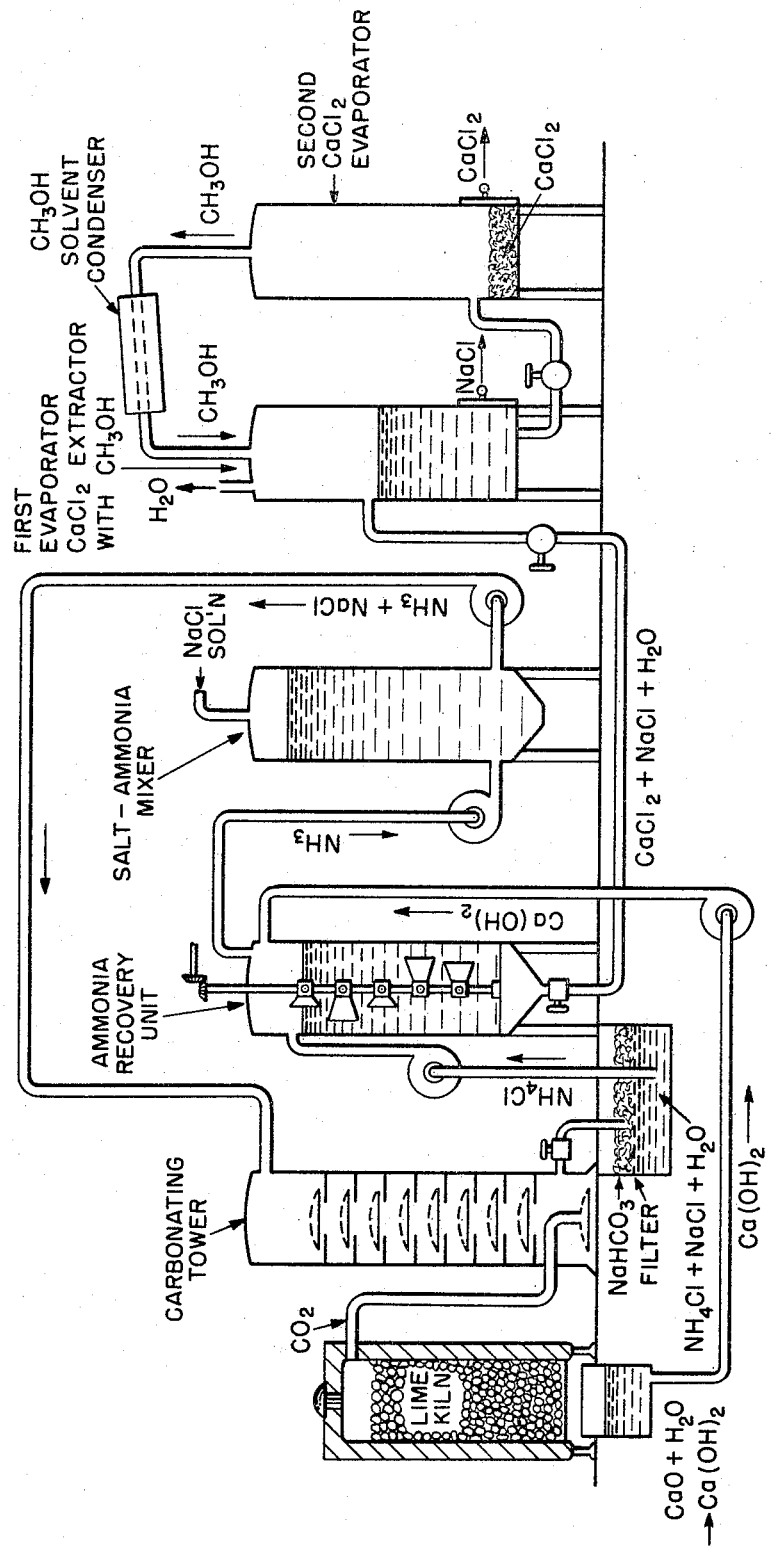

United States Patent Office 3,329,479
Patented July 4, 1967

3,329,479
PROCESS FOR RECOVERING CALCIUM CHLORIDE FROM THE AMMONIUM CHLORIDE WASTE LIQUOR OF THE AMMONIA SODA PROCESS
Edmond Hustinx, Looiersgracht 4, Maastricht, Limburg, Netherlands
Filed Apr. 21, 1964, Ser. No. 361,473
3 Claims. (Cl. 23—90)

This invention relates to a process for recovering calcium chloride from the waste liquor obtained as a by-product in the ammonia soda process, and more particularly, to a method of separating calcium chloride from sodium chloride in the dried mixture thereof from such liquor by extraction with alcohol.

The ammonia soda process was first successfully applied on a commercial scale by Ernest and Edward Solvay in 1861. In this process, a solution of sodium chloride is saturated with ammonia, and then carbon dioxide is passed through the liquid in a carbonating tower, bubbling up through the solution. The main reaction can be characterized as follows:

(1) 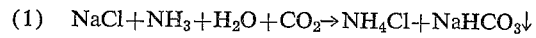
$$NaCl + NH_3 + H_2O + CO_2 \rightarrow NH_4Cl + NaHCO_3\downarrow$$

Sodium bicarbonate is only slightly soluble in the reaction mixture, and therefore precipitates. This precipitate is removed by filtration, and sodium carbonate is obtained from it (after it has been washed with cold water) by calcining, according to the following reaction:

(2) 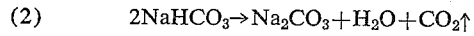
$$2NaHCO_3 \rightarrow Na_2CO_3 + H_2O + CO_2\uparrow$$

The raw materials used in this process are all cheap, except ammonia, and therefore the success of the process depends upon its efficient recovery. This is normally done by treating the ammonium chloride solution obtained as filtrate from the reaction with calcium oxide or calcium hydroxide. This reaction proceeds as follows:

(3) 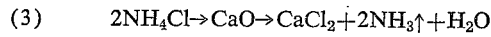
$$2NH_4Cl + CaO \rightarrow CaCl_2 + 2NH_3\uparrow + H_2O$$

The ammonia gas thus obtained is used over again, with surprisingly small loss. However, the resulting liquor containing calcium chloride includes also a large proportion of sodium chloride, which is not recovered therefrom, and is normally wasted. Approximately one-third of the sodium chloride used as a starting material may be lost with the calcium chloride in this way, due to the failure of the initial precipitation of sodium bicarbonate to take place quantitatively.

The lime needed in the above reaction is obtained by heating limestone, producing calcium oxide and $CO_2$, and the $CO_2$ obtained is utilized in the carbonating towers. As a result, the only raw materials needed in the Solvay process are salt, limestone, and sufficient ammonia to replace the losses. It is apparent, however, from the above series of reactions that if the by-product calcium chloride could be obtained in a state of high purity, and the sodium chloride which is lost with it as an impurity could also be recovered, the economics of the process would be very greatly improved.

In accordance with the instant invention, a process is provided to permit the recovery of sodium chloride normally lost with the ammonium chloride and calcium chloride, as well as the recovery of calcium chloride in a substantially pure state. In accordance with the process of this invention, the reaction solution obtained after treatment of the ammonium chloride with calcium oxide or calcium hydroxide is dried, and then extracted with a lower aliphatic alcohol having from one to about four carbon atoms in which calcium chloride is substantially more soluble than sodium chloride. Since the sodium chloride is substantially insoluble in these alcohols, repeated extraction with the alcohol results in separation of calcium chloride from sodium chloride. The sodium chloride in a substantially pure condition can be separated by filtration from the extracting solution, and returned to the ammonia soda process. The alcohol solvent employed can be distilled from the extract, and the calcium chloride recovered as a substantially pure salt, with the alcohol being returned to the extraction stage.

The extraction can be effected by any lower aliphatic alcohol in which calcium chloride is significantly more soluble than sodium chloride, thus enabling the separation to proceed. Such alcohols normally have from one to about four carbon atoms, and include methyl alcohol, ethyl alcohol, propyl alcohol, butyl alcohol, isobutyl alcohol, and tertiary butyl alcohol.

The extraction can be carried out at room temperature. However, it is usually facilitated at elevated temperatures at which calcium chloride is more soluble in the alcohol, up to the boiling point of the alcohol. The use of high temperatures also speeds up the solvent recovery later.

The process of the invention has the advantage not only that the sodium chloride and calcium chloride are recovered in a substantially pure state, but also that it is no longer necessary to carry out the first stage (Reaction 1) of the ammonia soda process so as to ensure that it is as quantitative as possible. Any sodium chloride that remains unreacted is now recovered and returned to the reaction mixture, substantially without loss. It is, therefore, possible to carry out the ammonia soda pocess completely automatically, without great attention to quantitative yield in Reaction 1, and without any loss in the economic advantage of the process of the invention.

The process of the invention is illustrated by the following example, which in the opinion of the inventor represents the best embodiment of his invention.

The drawing is a flow sheet showing how the process of the invention is fitted into a conventional Solvay system, and is the system used in the example.

*Example*

An aqueous solution of sodium chloride was prepared containing one hundred moles of sodium chloride dissolved in 22,000 kilograms of water. This solution was saturated with ammonia gas at room temperature, and then passed through the carbonating tower of the drawing, fitted as shown with a plurality of perforated plate dividers arranged horizontally. The sodium chloride solution saturated with ammonia was passed downwardly through the tower, trickling over the perforated plates. Carbon dioxide gas was bubbled up through the liquid in the tower, while maintaining the reaction temperature at 50° C. The carbon dioxide was obtained by calcining limestone in a lime kiln, in the conventional Solvay procedure.

The reaction solution, a slurry of sodium bicarbonate in aqueous ammonium chloride solution, was withdrawn from the bottom of the tower through a filter, where the sodium bicarbonate which precipitated was separated out.

The aqueous ammonium chloride solution obtained as a filtrate, including also a high proportion of sodium chloride, was withdrawn, and passed through the ammonia recovery unit of the Solvay process. This consisted of a reactor fitted with stirring means into which an aqueous calcium hydroxide slurry was introduced at the top, together with the ammonium chloride solution. The calcium hydroxide slurry was obtained by slaking the calcium oxide residue from the lime kiln with water. Ammonia released from this solution, which was kept at a temperature of 50° C., was drawn off at the top of the reactor, while the resulting aqueous calcium chloride and sodium chloride solution was withdrawn at the bottom.

This solution was passed to a first evaporator where the water was removed, leaving a dry solid. After all water had been removed, the dry solid was extracted with methyl alcohol, in which calcium chloride is soluble to an amount of 29% at room temperature. The residue was extracted until no more calcium chloride remained, and the resulting extracts combined in a second evaporator. The methyl alcohol was then removed by distillation, and returned to the extraction vessel.

The residue in the first evaporator was substantially pure sodium chloride. The residue in the second evaporator was substantially pure calcium chloride. The sodium chloride recovered in the first evaporation vessel was returned to the initial reaction solution.

This example illustrates how the extraction procedure of the invention can be operated as a semi-continuous process, extracting the residual sodium chloride and calcium chloride solids batchwise, and continuously returning the recovered solvent to this extraction stage.

The procedure described in this example can be carried out with equivalent results using ethyl alcohol, isopropyl alcohol, and isobutyl alcohol as the solvents, either alone or in admixture with ethyl alcohol.

The following is claimed:

1. In the ammonia soda process for the production of sodium carbonate by reaction of sodium chloride, ammonia, and carbon dioxide to form sodium bicarbonate and ammonium chloride, effecting reaction between sodium chloride, ammonia and carbon dioxide to form sodium bicarbonate and ammonium chloride, converting the sodium bicarbonate to sodium carbonate, and the ammonium chloride to a solution of ammonia gas and calcium chloride and in addition unreacted sodium chloride, and recovering the ammonia from the solution, the improvement which comprises drying the solution containing the calcium chloride and sodium chloride, to produce a solid mixture thereof, extracting the mixture with an aliphatic alcohol having from one to four carbon atoms, separating the residue from the extract, and distilling the alcohol from the extract, thereby recovering substantially pure sodium chloride as residue, and substantially pure calcium chloride from the extract, and recycling the sodium chloride for reaction with ammonia in the ammonia soda process.

2. The process in accordance with claim 1 wherein the reaction between sodium chloride, ammonia, and carbon dioxide is effected without regard to the stoichiometric proportions thereof.

3. The process in accordance with claim 1 wherein the alcohol is methyl alcohol.

References Cited

UNITED STATES PATENTS

| | | | |
|---|---|---|---|
| 1,352,211 | 9/1920 | Nagelvoort | 23—65 |
| 1,359,097 | 11/1920 | Nishigawa | 23—65 |
| 1,789,235 | 1/1931 | Kipper | 23—65 |
| 2,032,702 | 3/1936 | Keene et al. | 23—90 |
| 2,032,727 | 3/1936 | Sundstrom et al. | 23—90 |
| 3,231,340 | 1/1966 | Gaska | 23—90 X |

FOREIGN PATENTS 255,042  4/1927  Great Britain.

OTHER REFERENCES

J. W. Mellor's "A Comprehensive Treatise on Inorganic and Theoretical Chemistry," vol. 2 (1922 edition), p. 430. Longmans, Green & Company, New York.

J. W. Mellor's "A Comprehensive Treatise on Inorg. and Theo. Chem.," vol. 2 (1922), pp. 542 and 543, and vol. 3 (1923), p. 711. Longmans, Green & Company, New York.

Seidell's book "Solubilities of Inorganic and Organic Compounds," vol. 1, 2nd ed., 2nd printing, pp. 197, 646 and 648, D. Van Nostrand Company, New York.

OSCAR R. VERTIZ, *Primary Examiner.*

EDWARD STERN, *Examiner.*